US009811135B2

(12) United States Patent
Agarwal et al.

(10) Patent No.: US 9,811,135 B2
(45) Date of Patent: Nov. 7, 2017

(54) LOW-POWER TYPE-C RECEIVER WITH HIGH IDLE NOISE AND DC-LEVEL REJECTION

(71) Applicant: Cypress Semiconductor Corporation, San Jose, CA (US)

(72) Inventors: Rishi Agarwal, Santa Clara, CA (US); Nicholas Alexander Bodnaruk, Sunnyvale, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 14/977,589

(22) Filed: Dec. 21, 2015

(65) Prior Publication Data

US 2017/0052578 A1 Feb. 23, 2017

Related U.S. Application Data

(60) Provisional application No. 62/182,273, filed on Jun. 19, 2015, provisional application No. 62/218,432, filed on Sep. 14, 2015.

(51) Int. Cl.

| | |
|---|---|
| ***G06F 1/26*** | (2006.01) |
| ***G06F 13/38*** | (2006.01) |
| ***G06F 1/22*** | (2006.01) |
| ***G06F 13/40*** | (2006.01) |
| ***G06F 1/32*** | (2006.01) |
| ***G06F 13/42*** | (2006.01) |
| *H02J 7/00* | (2006.01) |

(52) U.S. Cl.

CPC ................ *G06F 1/263* (2013.01); *G06F 1/22* (2013.01); *G06F 1/266* (2013.01); *G06F 1/3287* (2013.01); *G06F 13/38* (2013.01); *G06F 13/385* (2013.01); *G06F 13/40* (2013.01); *G06F 13/4282* (2013.01); *H02J 2007/0062* (2013.01)

(58) Field of Classification Search

CPC . G06F 1/22; G06F 1/263; G06F 1/266; G06F 1/3287; G06F 13/40; G06F 13/38; G06F 13/385; G06F 13/4282

See application file for complete search history.

(56) References Cited

U.S. PATENT DOCUMENTS

| | | | |
|---|---|---|---|
| 7,963,773 | B2 | 6/2011 | Palli et al. |
| 8,432,981 | B1 | 4/2013 | An et al. |
| 8,891,216 | B2 | 11/2014 | Mullins et al. |
| 9,153,986 | B1 | 10/2015 | Herr et al. |
| 2004/0022827 | A1 | 2/2004 | Satomi et al. |

(Continued)

OTHER PUBLICATIONS

"USB Type-C Connector Solutions", Digi-Key Electronics, 2 pages.

(Continued)

*Primary Examiner* — Nimesh G Patel

(57) ABSTRACT

Techniques for low-power USB Type-C receivers with high DC-level shift tolerance and high noise rejection are described herein. In an example embodiment, a USB-enabled device comprises a receiver circuit coupled to a Configuration Channel (CC) line of a USB Type-C subsystem. The receiver circuit is configured to receive data from an incoming signal on the CC line even when the incoming signal has more than 250 mV of DC offset with respect to local ground, and to reject the incoming signal even when the incoming signal includes noise with a magnitude of more than 300 mVpp.

20 Claims, 7 Drawing Sheets

(56) References Cited

U.S. PATENT DOCUMENTS

| | | | | |
|---|---|---|---|---|
| 2005/0024063 | A1 | 2/2005 | Mcnitt et al. | |
| 2005/0189983 | A1 | 9/2005 | Sivero et al. | |
| 2006/0082487 | A1 | 4/2006 | Chiang | |
| 2006/0215794 | A1 | 9/2006 | Murugan et al. | |
| 2008/0055384 | A1 | 3/2008 | Noe et al. | |
| 2013/0285641 | A1* | 10/2013 | Mkrtchyan | G01R 19/10 324/98 |
| 2014/0078815 | A1 | 3/2014 | Hollis | |
| 2014/0159807 | A1 | 6/2014 | Sun et al. | |
| 2015/0013786 | A1 | 1/2015 | Esposito | |
| 2015/0212497 | A1 | 7/2015 | Dunstan | |
| 2015/0269102 | A1 | 9/2015 | Inha et al. | |
| 2015/0270733 | A1 | 9/2015 | Inha et al. | |
| 2015/0293514 | A1* | 10/2015 | Tupala | G06F 1/266 700/295 |
| 2016/0156137 | A1* | 6/2016 | Pan | G06F 13/385 439/78 |
| 2016/0188514 | A1* | 6/2016 | Forghani-Zadeh | G06F 13/385 710/313 |
| 2016/0190794 | A1* | 6/2016 | Forghani-Zadeh | H02H 3/26 361/86 |

OTHER PUBLICATIONS

"USB Type-C Portfolio", 2015, FairChild Semi.com, 2 pages.

Hyde, et. al, Designing USB Type-C Products Using Cypress's CCG1 Controllers, Cypress.com/AN96527, 31 Pages.

TPS65982 "USB Type-C and USB PD Controller, Power Switch, and High Speed Multiplexer", Jun. 2015, 114 Pages.

Busson et al, A solution to reduce the latency of a Multi Gigabit Transceiver (Virtex-II Pro). Effect of clock jitter on the Bit Error Rate., 4 pages.

Hyde el al., Designing USB Type-C Products Using Cypress's CCG1 Controllers, Jun. 3, 2015, 31 pages.

International Search Report for International Application No. PCT/US2016/018520 dated Apr. 21, 2016; 3 pages.

NXP GreenChip, AN11123 GreenChip TEA1731(L)TS fixed frequency flyback controller, Apr. 2012, 49 pages.

USB Type-C Engineering Change Notice, Apr. 3, 2015, 3 pages, USB Implementers Forum.

Written Opinion of the International Searching Authority for International Application No. PCT/US2016/018520 dated Apr. 21, 2016; 9 pages.

* cited by examiner 400
406
404
402
Voltage (V)
6.0
5.5
5.0
4.5
4.0
1.5
1.0
0.5
0.0
-0.5

410
416
414
412
Voltage (V)
6.0
5.5
5.0
4.5
4.0
1.5
1.0
0.5
0.0
-0.5
39.0U
40.0U
41.0U
42.0U
44.0U
45.0U
46.0U
47.0U
Time (S)

LOW-POWER TYPE-C RECEIVER WITH HIGH IDLE NOISE AND DC-LEVEL REJECTION

PRIORITY

This application claims the priority and benefit of U.S. Provisional Application No. 62/218,432, filed on Sep. 14, 2015, and of U.S. Provisional Application No. 62/182,273, filed on Jun. 19, 2015, both of which are incorporated by reference herein in their entireties.

TECHNICAL FIELD

This disclosure generally relates to Universal Serial Bus (USB) Type-C subsystems.

BACKGROUND

Various electronic devices (e.g., such as smartphones, cell phones, tablets, notebook computers, laptop computers, desktop computers, hubs, etc.) are configured to communicate through Universal Serial Bus (USB) connectors. A new emerging technology for USB connectors, called USB Type-C, was recently defined in various releases of the USB Type-C specification (e.g., such as Release 1.0 dated Aug. 11, 2014, Release 1.1 dated Apr. 3, 2015, etc). The various releases of the USB Type-C specification define USB Type-C receptacles, plug, and cables that can support USB communications as well as power delivery over newer USB power delivery protocols defined in various revisions of the USB Power Delivery (USB-PD) specification (e.g., such as Revision 1.0 released Jul. 5, 2012, Revision 2.0 released Aug. 11, 2014, etc).

Among other parameters, the USB-PD specification defines upper limits on noise and DC-level voltage shifts that are allowed on Configuration Channel (CC) lines of USB Type-C connector subsystems. However, it is left to the particular USB Type-C implementations to manage the overall communications on the CC lines in the various electronic devices. To this end, current USB Type-C implementations are not very efficient in noise detection and DC-level voltage shift tolerance on CC lines, even though higher noise rejection and higher DC-level shift tolerance can enhance the overall operation and power consumption of the USB Type-C implementations in both Type-C cables and Type-C enabled electronic devices.

DETAILED DESCRIPTION

Figure 1A:
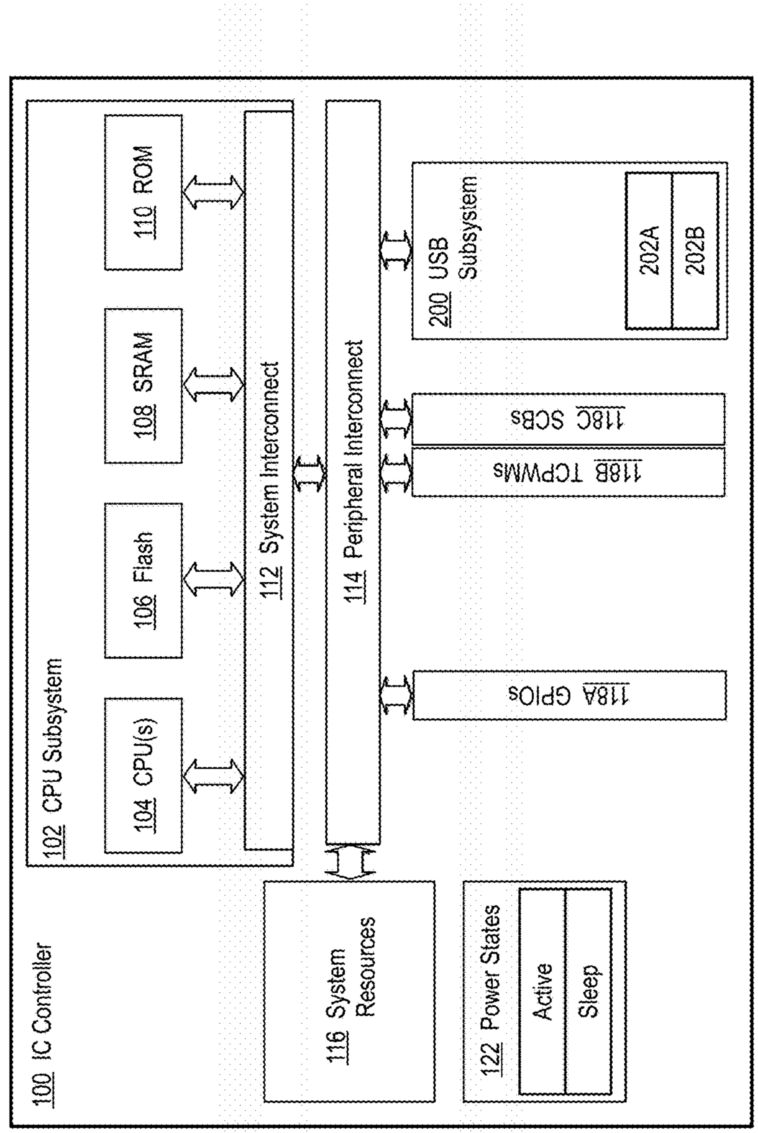
FIG. 1A illustrates an example on-die integrated circuit (IC) controller with a Type-C subsystem in accordance with some embodiments.

The following description sets forth numerous specific details such as examples of specific systems, components, methods, and so forth, in order to provide a good understanding of various embodiments of the techniques described herein for a low-power USB Type-C receiver with high DC-level shift tolerance and high noise rejection. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to “an embodiment”, “one embodiment”, “an example embodiment”, “some embodiments”, and “various embodiments” means that a particular feature, structure, or characteristic described in connection with the embodiment(s) is included in at least one embodiment of the invention. Further, the appearances of the phrases “an embodiment”, “one embodiment”, “an example embodiment”, “some embodiments”, and “various embodiments” in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as “examples”, are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for USB Type-C receivers in electronic devices. Examples of such electronic devices include, without limitation, personal computers (e.g., desktop computers, laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity devices (e.g., cables, adapters, hubs, docking stations, etc.), audio/video/data recording and/or playback devices (e.g., cameras, voice recorders, hand-held scanners, monitors, etc.), and other similar electronic devices that can use Type-C connectors (interfaces) for communication and/or battery charging.

As used herein, an electronic device is referred to as “USB-enabled” if the electronic device complies with at least one release of a Universal Serial Bus (USB) specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a peripheral electronic device attaches to a host device through a USB port of the host device. A USB 2.0 port includes a power line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

Some electronic devices may be compliant with a specific release and/or version of the USB Type-C specification (e.g., such the USB Type-C Specification, Release 1.0, the USB Type-C Specification, Release 1.1, or a later release). As used herein, a USB "Type-C subsystem" refers to hardware circuitry that may be controllable by firmware and/or software in an integrated circuit (IC) controller, which is configured and operable to perform the functions and satisfy the requirements specified in at least one release of the USB Type-C specification. Examples of such Type-C functions and requirements may include, without limitation, data and other communications according to USB 2.0 and USB 3.0/3.1, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc.

According to the USB Type-C specification, a USB Type-C cable is an active cable having one or more integrated circuit (IC) devices disposed therein to define USB Type-C ports at both ends of the cable. In order to support USB communications according to USB 2.0 and USB 3.0/3.1, a Type-C port provides VBUS, D+, D−, GND, SSTX+, SSTX−, SSRX+, and SSRX− lines, among others. In addition, a Type-C port also provides a Sideband Use (denoted SNU) line for signaling of sideband functionality and a Configuration Channel (denoted CC) line for discovery, configuration, and management of connections across a Type-C cable. A Type-C port may be associated with a Type-C plug and with a Type-C receptacle. For ease of use, the Type-C plug and the Type-C receptacle are designed as a reversible pair that operates regardless of the plug-to-receptacle orientation. Thus, a standard Type-C connector (interface), disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others. When the Type-C plug of a cable is attached to a Type-C receptacle, one of the CC lines is connected through the cable to establish signal orientation and the other CC line is repurposed as 5V power line (denoted Vconn) for powering the integrated circuit (IC) device(s) disposed within the Type-C cable.

Some electronic devices may be compliant with a specific revision and/or version of the USB-PD specification (e.g., such the USB Power Delivery Specification, Revision 1.0, the USB Power Delivery Specification, Revision 2.0, or a later revisions and/or versions thereof). The USB-PD specification defines a standard designed to enable the maximum functionality of USB-enabled devices by providing more flexible power delivery thereto/from along with data communications over a single Type-C cable through USB ports. For example, the USB-PD specification describes the architecture, protocols, power supply behavior, parameters, and cabling necessary for managing power delivery over USB Type-C cables at up to 100 W. According to the USB-PD specification, USB-enabled devices may negotiate for more current and/or higher or lower voltages over the a USB Type-C cable (e.g., by using VBUS or a CC line as the communications channel) than are defined in older USB specifications (e.g., such as the USB 2.0 Specification, USB 3.1 Specification, the USB Battery Charging Specification Rev. 1.0/1.1/1.2, etc).

The USB-PD specification defines various parameters to facilitate communications on the on Configuration Channel (CC) lines of USB Type-C cables. Examples of such parameters include upper limits on noise and direct current (DC)-level voltage shifts that are allowed on the CC lines. For example, since a USB Type-C cable is an active device with one or more integrated circuit (IC) device(s) disposed therein, when a Type-C cable is in use (e.g., when it is connected to at least one USB-enabled device) the IC(s) within the cable consume power and various lines within the cable may cause noise on other lines through capacitive coupling. Thus, in its various revisions, the USB-PD specification defines an upper limit on the allowed CC-line noise of 250 mVpp to 300 mVpp (where Vpp is peak-to-peak voltage) and an upper limit of 250 mV on the allowed DC-level shift from one end of the Type-C cable to the other.

Noise generated by capacitive coupling can adversely affect communications and operations based on CC lines of USB Type-C subsystems in Type-C cables and receptacles. To avoid such adverse effects, the USB-PD specification defines a theoretical maximum of 250 mVpp or at most up to 300 mVpp (according various specification revisions) of noise that is allowed on a CC line of a Type-C cable during operation. Theoretically, per the USB-PD specification this means that any signal on the CC line with peak-to-peak voltage greater than 250 mVpp (or up to 300 mVpp) is to be considered a valid (non-noise) signal. In practice, conventional USB Type-C subsystem implementations could reject as noise only signals with about up to 160 mVpp of noise magnitude because conventionally-designed hardware circuitry used for noise detection and rejection needed a fairly large Vpp margin (e.g., about 100 mVpp) to properly distinguish between noise and a valid signal. However, a noise rejection of only up to 160 mVpp is not sufficient for many practical Type-C-based applications. This is not the least because during actual operation, noise sources in a Type-C cable (e.g., such as communications on the D+, D− lines, etc.) may generate through capacitive coupling on the CC line noise that has voltage magnitude larger than 250 mVpp. Thus, one disadvantage of conventional USB Type-C subsystem implementations is that noise on the CC line with more than 250 mVpp would be considered as a valid (non-noise) signal and the conventional USB Type-C subsystem would wake up its IC controller (possibly continuously, in response to persistent noise) and expend power and other on-chip resources to process the signal, while in fact this signal should be rejected as noise.

A DC-level voltage shift (also referred to as DC-level shift, or DC offset) with respect to local ground can also adversely affect communications on CC lines of USB Type-C subsystems in Type-C cables. To avoid such adverse effects, the USB-PD specification defines a maximum amount of DC-level shift that is allowed during operation for signals transmitted on the CC line of a Type-C cable. Specifically, while in operation a signal on the CC line of a Type-C cable is allowed to be between 0V and 1.2V, the USB-PD specification allows such signal to be shifted up or down by up to 250 mV with respect to local ground. For example, during operation, the device on one side of the Type-C cable would be a power provider that would provide voltage with respect to its local ground, while the device (and/or the cable itself) on the other side would be a power consumer that would receive the voltage with respect to its local ground. Because of the resistance of the cable itself, this causes an IR (voltage) drop across one end of the Type-C cable to the other. Thus, when the device on one side of the Type-C cable transmits a signal on the CC line, this signal is effectively shifted (up or down) by a certain amount with respect to the local ground of the device on the other side of the cable. To account for this voltage shift, the USB-PD specification allows for a maximum of 250 mV of DC-level shift with respect to local ground. This shift margin of 250 mV, however, is not sufficient for many practical Type-C-based applications. For example, different Type-C cables sold by different manufacturers may not be fully compliant with the USB Type-C specification and/or may have different internal resistances for many reasons (e.g., such as different manufacturing technologies, different conductive and isolation materials used in manufacture, different types of IC chips used therein, etc). In another example, in various operational contexts various manufacturers of USB-enabled devices may want to provide higher currents across a Type-C cable to provide for faster power delivery times, thereby increasing the IR drop across the Type-C cable beyond the margin allowed by the USB-PD specification. In this regard, conventional USB Type-C subsystem implementations are deficient since conventional hardware circuitry is not designed to provide for CC line communications with DC-level shifts that are higher than the margins allowed by the USB-PD specification.

To address the above and other deficiencies of conventional USB Type-C subsystems (e.g., with respect to higher DC-level shift tolerance and higher noise rejection), the techniques for USB Type-C receivers described herein provide for a receiver circuit that is configured to receive data from an incoming signal on a CC line even when the incoming signal has more than 250 mV of DC offset with respect to local ground, and/or to reject the incoming signal even when the incoming signal comprises noise with a magnitude of more than 300 mVpp (e.g., such as noise magnitude that is in one or more of the ranges of 300 mVpp to 500 mVpp, 300 mVpp to 350 mVpp, 350 mVpp to 400 mVpp, 400 mVpp to 450 mVpp, 450 mVpp to 500 Vpp, or any sub-ranges thereof). As used herein, "incoming signal" refers to a signal on a certain (e.g., CC) line of a USB Type-C subsystem. In the context of the techniques described herein, such incoming signal may be a valid signal that carries BMC-encoded data or may be a signal that includes and/or is noise (e.g., during idle condition of the Type-C subsystem or the CC line thereof). In some embodiments, the receiver circuit may first determine whether an incoming signal on the CC line is noise or not—e.g., even if the incoming signal carries noise with a peak-to-peak voltage in the range of 300-500 mVpp. The receiver circuit then rejects the incoming signal if the incoming signal is determined to be noise; otherwise, the receiver circuit processes (or causes processing of) the data from the incoming signal even if the incoming signal has more than 250 mV of DC offset with respect to local ground.

The techniques for USB Type-C receivers described herein may be embodied in several different types of Type-C applications. Examples of such types of Type-C applications include, but may not be limited to: a downstream facing port (DFP) USB application, in which an IC controller with a Type-C subsystem is configured to provide a downstream-facing USB port (e.g., in a USB-enabled host device); an upstream facing port (UFP) USB application, in which an IC controller with a Type-C subsystem is configured to provide an upstream-facing USB port (e.g., in a USB-enabled peripheral device or adapter); a dual role port (DRP) USB application, in which an IC controller with a Type-C subsystem is configured to support both DFP and UFP applications on the same USB port; and an electronically marked cable application (EMCA), in which an IC controller with a Type-C subsystem is configured to provide Type-C ports within a cable device (e.g., an active, Type-C cable, a Vconn-powered accessory, etc.)

In an example embodiment, a device comprises a receiver circuit coupled to a CC line of a USB Type-C subsystem. The receiver circuit is configured to receive data from an incoming signal on the CC line when the incoming signal has more than 250 mV of DC offset with respect to local ground. In this embodiment, the receiver circuit is further configured to reject the incoming signal as noise when the incoming signal comprises noise with a magnitude of more than 300 mVpp, for example noise magnitude in one of the ranges of 300 mVpp-350 mVpp, 350 mVpp-400 mVpp, 400 mVpp-450 mVpp, or 450 mVpp-500 Vpp. In one aspect of this embodiment, the incoming signal on the CC line may include noise during an idle condition, and in another aspect the incoming signal may include active noise. In one aspect, the receiver circuit may comprise: a capacitor coupled in series from the CC line to a restore node, where the capacitor is configured as a high-pass filter to block a DC component of the incoming signal on the CC line; a restoration circuit coupled to the restore node and configured to shift a voltage of the incoming signal to a first reference voltage; and a slicer circuit coupled to the restore node and configured to compare the shifted voltage to a second reference voltage. In this aspect, the restoration circuit may comprise: a first comparator configured as an operational amplifier in a feedback loop; a current source controlled by an output of the first comparator; and a current sink coupled to the restore node, where the restore node couples the capacitor to an output of the current source and to an input of the first comparator. In this aspect, the slicer circuit may comprise a second comparator, where a first input of the second comparator is coupled to the restore node and a second input of the second comparator is coupled to the second reference voltage. In this aspect, the first reference voltage and the second reference voltage are configured to define a voltage threshold (e.g., up to 500 mVpp) at which an output of the slicer circuit is toggled to indicate that the incoming signal is not noise. In this aspect, the slicer circuit is configured to generate a wake-up signal when the shifted voltage is above the voltage threshold, but the device is configured to remain in a sleep state when the shifted voltage is at or below the voltage threshold. In one aspect, the device comprises an integrated circuit (IC) chip, where the IC chip includes the USB Type-C subsystem and the USB Type-C subsystem includes the receiver circuit. In an example aspect, the device is a USB Type-C cable.

In an example embodiment, an integrated circuit (IC) controller comprises a USB Type-C subsystem and a receiver circuit coupled to a CC line of the USB Type-C subsystem. The receiver circuit comprises: a capacitor coupled in series from the CC line to a restore node, where the capacitor is configured as a high-pass filter to block a DC component of an incoming signal on the CC line; a restoration circuit coupled to the restore node and configured to shift a voltage of the incoming signal to a first reference voltage; and a slicer circuit coupled to the restore node and configured to compare the shifted voltage to a second reference voltage. In one aspect of this embodiment, the restoration circuit of the IC controller comprises: a first comparator configured as an operational amplifier in a feedback loop; a current source controlled by an output of the first comparator; and a current sink coupled to the restore node, where the restore node couples the capacitor to an output of the current source and to an input of the first comparator. In one aspect, the slicer circuit of the IC controller comprises a second comparator, where a first input of the second comparator is coupled to the restore node and a second input of the second comparator is coupled to the second reference voltage. In this aspect, the first reference voltage and the second reference voltage are configured to define a voltage threshold of up to 500 mVpp, where an output of the slicer circuit is toggled to indicate that the incoming signal is not noise when the shifted voltage is above the voltage threshold. In an example aspect, the receiver circuit of the IC controller is configured to receive data from the incoming signal on the CC line when the incoming signal has more than 250 mV of DC offset with respect to local ground.

In an example embodiment, a system comprises a USB Type-C cable and a USB-enabled device attached and/or connected to the USB Type-C cable. The USB-enabled device comprises a receiver circuit coupled to a CC line of the USB Type-C cable, where the receiver circuit is configured to receive data from an incoming signal on the CC line when the incoming signal has more than 250 mV of DC offset with respect to local ground. In one aspect of this embodiment, the receiver circuit is further configured to reject the incoming signal when the incoming signal includes noise with a magnitude of more than 300 mVpp, where in the same or a different aspect the magnitude of the noise can be in a range from 300 mVpp to 500 mVpp.

FIG. 1A illustrates an example device 100 that is configured in accordance with the techniques for USB Type-C receivers described herein. In the embodiment illustrated in FIG. 1A, device 100 is an integrated circuit (IC) controller chip manufactured on an IC die. For example, IC controller 100 may be a single-chip IC device from a family of USB controllers developed by Cypress Semiconductor Corporation, San Jose, Calif.

Among other components, IC controller 100 includes CPU subsystem 102, peripheral interconnect 114, system resources 116, various input/output (I/O) blocks (e.g., 118A-118C), and USB subsystem 200. In addition, IC controller 100 provides circuitry and firmware that is configured and operable to support a number of power states 122.

CPU subsystem 102 includes one or more CPUs (central processing units) 104, flash memory 106, SRAM (Static Random Access Memory) 108, and ROM (Read Only Memory) 110 that are coupled to system interconnect 112. CPU 104 is a suitable processor that can operate in a system-on-chip device. In some embodiments, the CPU may be optimized for low-power operation with extensive clock gating and may include various internal controller circuits that allow the CPU to operate in various power states. For example, the CPU may include a wake-up interrupt controller that is configured to wake the CPU from a sleep state, thereby allowing power to be switched off when the IC chip is in the sleep state. Flash memory 106 can be any type of program memory (e.g., NAND flash, NOR flash, etc.) that is configurable for storing data and/or programs. SRAM 108 can be any type of volatile or non-volatile memory that is suitable for storing data and firmware/software instructions accessed by CPU 104. ROM 110 can be any type of suitable storage that is configurable for storing boot-up routines, configuration parameters, and other system-on-chip firmware. System interconnect 112 is a system bus (e.g., a single-level or multi-level Advanced High-Performance Bus, or AHB) that is configured as an interface that couples the various components of CPU subsystem 102 to each other, as well as a data and control interface between the various components of the CPU subsystem and peripheral interconnect 114.

Peripheral interconnect 114 is a peripheral bus (e.g., a single-level or multi-level AHB) that provides the primary data and control interface between CPU subsystem 102 and its peripherals and other resources, such as system resources 116, I/O blocks (e.g., 118A-118C), and USB subsystem 200. The peripheral interconnect may include various controller circuits (e.g., direct memory access, or DMA controllers), which may be programmed to transfer data between peripheral blocks without burdening the CPU subsystem. In various embodiments, each of the components of the CPU subsystem and the peripheral interconnect may be different with each choice or type of CPU, system bus, and/or peripheral bus.

System resources 116 include various electronic circuits that support the operation of IC controller 100 in its various states and modes. For example, system resources 116 may include a power subsystem that provides the power resources required for each controller state/mode such as, for example, voltage and/or current references, wake-up interrupt controller (WIC), power-on-reset (POR), etc. In some embodiments, the power subsystem of system resources 116 may also include circuits that allow IC controller 100 to draw power from external sources with several different voltage and/or current levels. System resources 116 may also include a clock subsystem that provides various clocks that are used by IC controller 100, as well as circuits that allow various controller functions such as external reset.

An IC controller, such as IC controller 100, may include various different types of I/O blocks and subsystems in various embodiments and implementations. For example, in the embodiment illustrated in FIG. 1A, IC controller 100 includes GPIO (general purpose input output) blocks 118A, TCPWM (timer/counter/pulse-width-modulation) blocks 118B, SCBs (serial communication blocks) 118C, and USB subsystem 200. GPIOs 118A include circuits configured to implement various functions such as, for example, pull-ups, pull-downs, input threshold select, input and output buffer enabling/disabling, multiplex signals connected to various I/O pins, etc. TCPWMs 118B include circuits configured to implement timers, counters, pulse-width modulators, decoders and various other analog/mixed signal elements that are configured to operate on input/output signals. SCBs 118C include circuits configured to implement various serial communication interfaces such as, for example, $I^2C$, SPI (serial peripheral interface), UART (universal asynchronous receiver/transmitter), etc.

USB subsystem 200 is a Type-C subsystem configured in accordance with the techniques described herein, and may also provide support for USB communications over USB ports (e.g., such as USB 2.0, USB 3.0/3.1, etc.) as well other USB functionality such as power delivery and battery charging. USB subsystem 200 includes a Type-C transceiver and physical layer logic, PHY (not shown), which are configured as an integrated baseband PHY circuit to perform various digital encoding/decoding functions (e.g., BMC encoding/decoding, cyclical redundancy checks, or CRC, etc.) and analog signal processing functions involved in physical layer transmissions. IC controller 100 (and/or the USB subsystem 200 thereof) may also be configured to respond to communications defined in the USB-PD Specification such as, for example, SOP, SOP', and SOP" messaging.

The Type-C transceiver of USB subsystem 200 includes receiver circuit(s) 202A and transmit circuit(s) 202B. A receiver circuit 202A is configured in accordance with the techniques described herein. For example, receiver circuit 202A is coupled to a CC line and includes: a capacitor coupled in series from the CC line to a restore node, where the capacitor is configured to block a DC component of an incoming signal on the CC line; a restoration circuit coupled to the restore node and configured to shift a voltage of the incoming signal to a first reference voltage; and a slicer circuit coupled to the restore node and configured to compare the shifted voltage to a second reference voltage. In operation, the components of receiver circuit 202A are configured to receive data from an incoming signal on the CC line when the incoming signal has more than 250 mV of DC-level shift (DC offset) with respect to local ground and to reject the incoming signal when the incoming signal carries noise with a magnitude of more than 300 mVpp (e.g., up to 500 mVpp), in accordance with the techniques described herein.

Figure 1B:
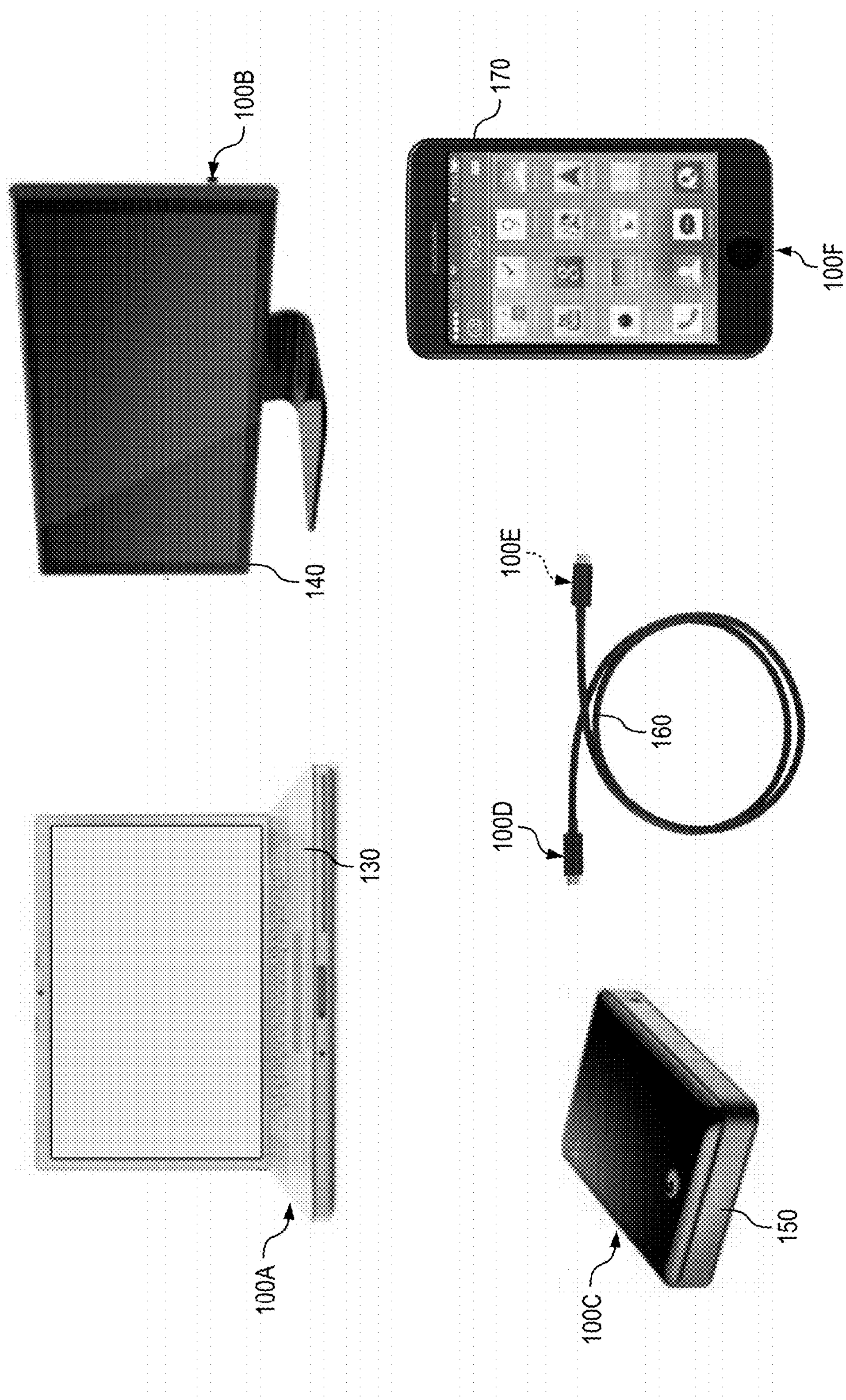
FIG. 1B illustrates example devices that can include the IC controller with the Type-C subsystem of FIG. 1A, according to example embodiments.

FIG. 1B illustrates example operational contexts in which the described techniques for USB Type-C receivers may be implemented. In each of these operational contexts, an IC controller (such as IC controller 100 of FIG. 1A) can be disposed and configured in a USB-enabled device in accordance with the techniques described herein. Referring to FIG. 1B, in one example embodiment a USB controller 100A may be disposed and configured in a computing device (e.g., laptop computer 130) as a DFP, UFP, and/or DRP USB application. In another example embodiment, a USB controller 100B may be disposed and configured in an electronic device (e.g., monitor 140) as a DFP, UFP, and/or DRP USB application. In yet another example embodiment, a USB controller 100C may be disposed and configured in a networking device (e.g., hub 150) as a UFP USB application. In yet another example embodiment, a USB controller 100D and (possibly) a USB controller 100E may be disposed and configured within one (or both) plugs of Type-C cable 160 as an EMCA application. In yet another example embodiment, a USB controller 100F may be disposed and configured in a mobile device (e.g., smartphone/tablet 170) as a DFP, UFP, and/or DRP USB application.

Figure 2:
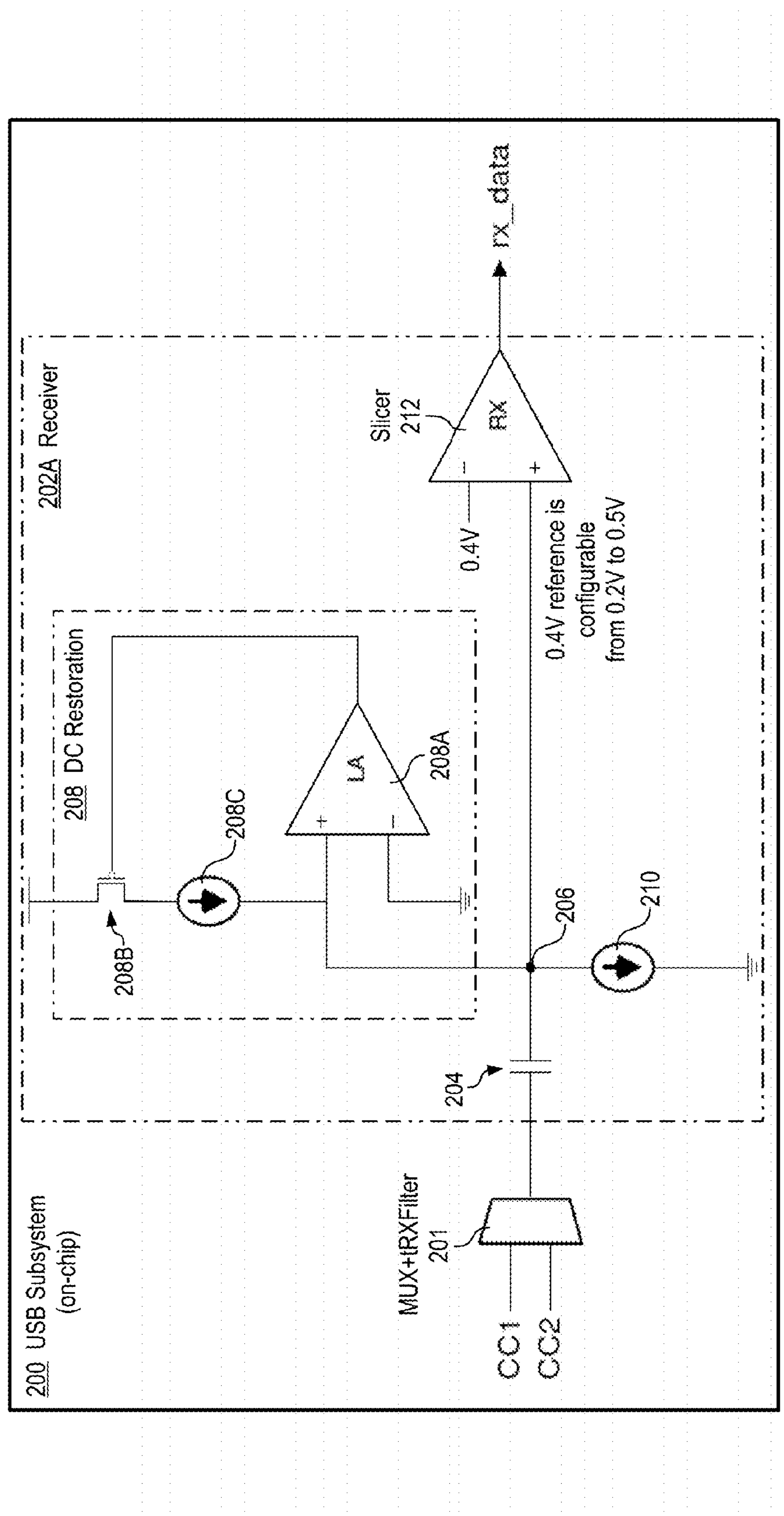
FIG. 2 illustrates a receiver circuit in an example on-chip USB Type-C subsystem, according to some embodiments.

FIG. 2 illustrates an example receiver circuit in a USB Type-C subsystem of an IC controller, according to some embodiments. Among other components (not shown), USB subsystem 200 comprises multiplexer 201 coupled to receiver circuit 202A in the receive path of the CC lines of the USB subsystem 200. Multiplexer 201 comprises a time-constant 100 ns single-pole filter (tRXFilter) as provided for in the USB-PD specification. In operation, multiplexer 201 multiplexes (on the receive path to receiver circuit 202A) that one CC line which is used for communications on the CC channel (while the other CC line is re-purposed as a 5V Vconn power line).

Receiver circuit 202A comprises capacitor 204, restore node 206, DC restoration circuit 208, weak current sink 210, and slicer circuit 212. Capacitor 204 is coupled in series from multiplexer 201 to restore node 206 and is configured as a high-pass filter. For example, capacitor 204 is configured to block the DC component of an incoming signal on the CC line, but does not attenuate frequency components of the incoming signal above a certain frequency. In this manner, capacitor 204 acts as an alternating current (AC) decoupling capacitor. Restore node 206 is coupled to restoration circuit 208, current sink 210, and slicer circuit 212. Restoration circuit 208 comprises comparator 208A, switch 208B, and weak current source 208C. The negative input terminal of comparator 208A is coupled to a first reference voltage (e.g., local ground in FIG. 2), and the positive input terminal of comparator 208A is coupled to restore node 206. The output of comparator 208A is coupled as a control signal to switch 208B. Switch 208B is coupled in series to turn on and off current source 208C, which in turn is coupled to restore node 206 and to the positive input terminal of comparator 208A. Slicer circuit 212 comprises a receive (RX) comparator. The positive input terminal of the RX comparator is coupled to restore node 206, and the negative input terminal of the RX comparator is coupled to a second reference voltage. As illustrated in FIG. 2, the second reference voltage is set at 400 mV, but it is noted that in various embodiments such reference voltage may be statically/dynamically configurable and/or programmable and may be set in a range from 200 mV to 500 mV. The rx_data output of the RX comparator in slicer circuit 212 is configured to toggle and pass through an incoming CC-line signal when the incoming signal is valid (non-noise) and carries data.

In operation, capacitor 204 acts as AC-decoupling capacitor to block the DC component of the incoming signal on the CC line and to allow only the signal swing through. Comparator 208A is configured in restoration circuit 208 as an operational amplifier in a feedback loop. Current source 208C is controlled through switch 208B by the output signal of comparator 208A. When the voltage on the positive input of comparator 208A (the voltage at restore node 206) reaches above the voltage on the negative input of the comparator, the comparator output goes high, thus cutting off current source 208C. When the voltage on the positive input of comparator 208A is below the voltage on the negative input of the comparator, the comparator output goes/remains low and enables current source 208C. In this manner, the voltage at restore node 206 (the voltage on the positive input of comparator 208A) is continuously regulated and is maintained to be very close to the first reference voltage at the negative input of comparator 208A (e.g., local ground, as illustrated in FIG. 2). Current sink 210 is coupled to restore node 206 and is configured "always-on" in order to ensure that any positive DC offsets (e.g., positive DC-level shifts) on the CC line are continuously recovered back to the first reference voltage set on the negative input of comparator 208A. Slicer circuit 212 is configured to detect and toggle when the incoming CC-line signal on restore node 206 is a valid (e.g., non-noise) signal. For example, when the voltage on the positive input of the RX comparator in slicer circuit 212 (the voltage at restore node 206) reaches above the second reference voltage on the negative input of the RX comparator, the output of the RX comparator goes high to indicate that the incoming signal on the CC line is not noise. In this manner, when the incoming CC-line signal carries data, the output of slicer circuit 212 passes the signal through to be used by other components (not shown) of USB subsystem 200 to generate a wake-up signal. When the voltage on the positive input of the RX comparator in slicer circuit 212 (the voltage at restore node 206) is/remains below the second reference voltage on the negative input of the RX comparator, the output of slicer circuit 212 remains low to indicate that the incoming signal on the CC line is noise. In this manner, slicer circuit 212 cuts off noise and does not generate (or cause to be generated) a wake-up signal to USB subsystem 200 and/or to its IC controller, thereby allowing the IC controller and/or the USB subsystem to remain in a sleep state and conserve power.

According to the techniques for USB Type-C receivers described herein, the difference between the first reference voltage (at the negative input of comparator 208A) and the second reference voltage (at the negative input of the RX comparator of slicer circuit 212) defines a voltage threshold with a voltage magnitude that must be reached by the incoming signal before slicer circuit 212 detects it as a valid signal. This voltage magnitude, e.g., Vth, is equivalent to the noise magnitude that receiver circuit 202A can reject, since the rx_data output of slicer circuit 212 will not toggle unless the incoming signal crosses the Vth noise threshold. In various embodiments, the Vth threshold magnitude may be set (e.g., by configuration and/or programming) to be close to half the magnitude of a normal signal, in order to provide for output with a duty cycle close to 50% on the rx_data output of slicer circuit 212. In this manner, the techniques described herein provide for improved noise rejection performance when compared to circuits in conventional USB Type-C receivers.

In addition, the techniques for USB Type-C receivers described herein achieve improved DC-level shift tolerance because of the operation of AC-decoupling capacitor 204 and restoration circuit 208. For example, when the incoming CC-line signal shifts its DC-level voltage, the voltage on restore node 206 will temporarily shift up or down by the same amount as the DC-level shift. Once the DC-level shift (e.g., the DC offset with respect to local ground) has stopped, the feedback loop in restoration circuit 208 will ensure that the voltage on restore node 206 returns to the reference voltage at the negative input of comparator 208A. In this manner, the techniques described herein provide for improved DC-level shift tolerance when compared to circuits in conventional USB Type-C receivers.

Figure 3:
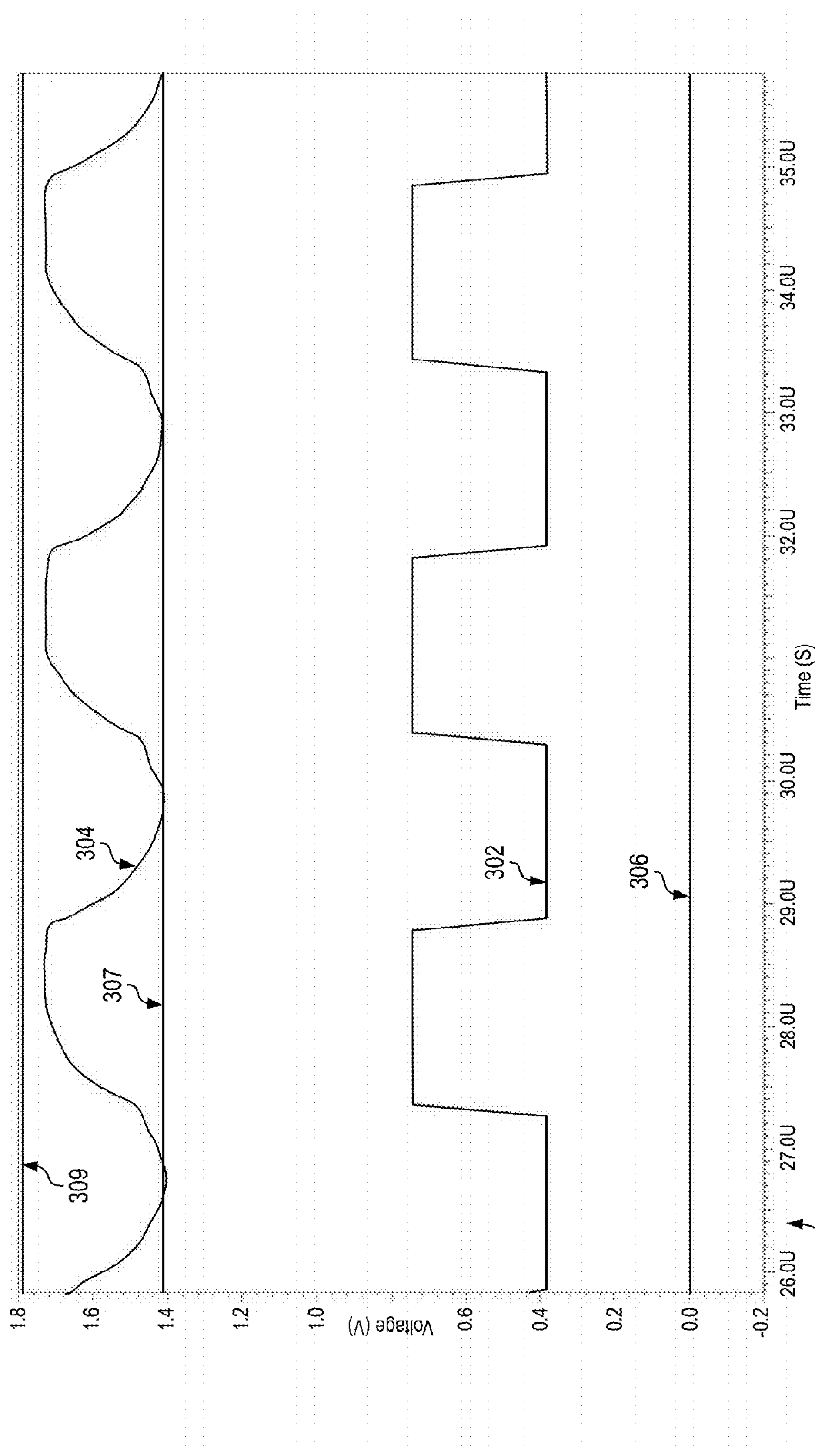
FIG. 3 illustrates a diagram with waveforms showing example restoration circuit operation, according to some embodiments.

FIG. 3 illustrates diagram 300 with waveforms showing example operation of a restoration circuit (e.g., such as restoration circuit 208 in FIG. 2). Diagram 300 illustrates an operational example in which the peak-to-peak voltage of an incoming CC-line signal is right under the Vth threshold magnitude so that the output of a receiver circuit (e.g., such as receiver circuit 202A in FIG. 2) is not toggling to indicate a valid signal.

Referring to FIG. 3, waveform 302 indicates the voltage of an incoming signal on the CC-line, waveform 304 indicates the voltage at a restore node (e.g., such as restore node 206 in FIG. 2), waveform 306 indicates the voltage on the rx_data output of a slicer circuit (e.g., such as slicer circuit 212 in FIG. 2), waveform 307 indicates the first reference voltage of a restoration circuit (e.g., such as restoration circuit 208 in FIG. 2), and waveform 309 indicates the second reference voltage of the slicer circuit (e.g., such as slicer circuit 212 in FIG. 2). As illustrated in diagram 300, waveform 302 indicates that the incoming CC-line signal has a peak-to-peak voltage of about 360 mVpp, while the difference between waveforms 309 and 307 indicates that the voltage threshold, Vth, is about 380 mVpp. Since the peak-to-peak voltage on the incoming signal is less than the voltage threshold magnitude for noise, the near-zero voltage of waveform 306 indicates that the incoming signal is determined as being noise. Diagram 300 also indicates that that the incoming CC-line signal is shifted up to about the voltage level of waveform 307 (e.g., up to the voltage at the restore node).

Figure 4A:
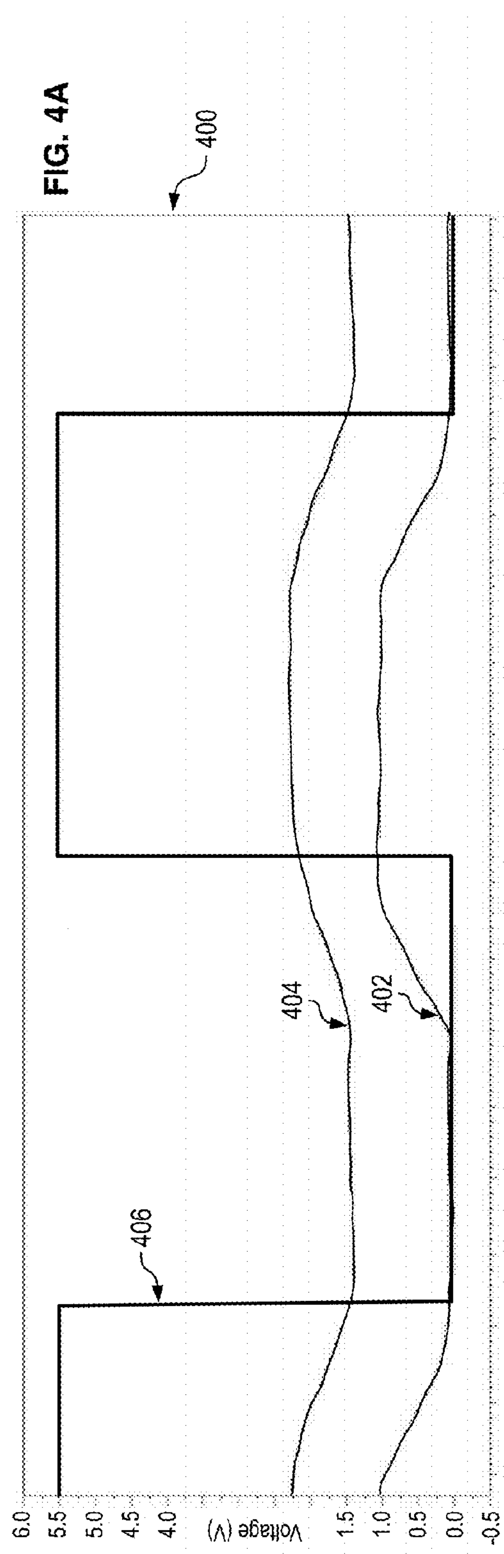
FIG. 4A illustrates a diagram with waveforms showing example slicer circuit operation for BMC (Biphase Mark Code)-encoded data “0”, according to some embodiments.
Figure 4B:
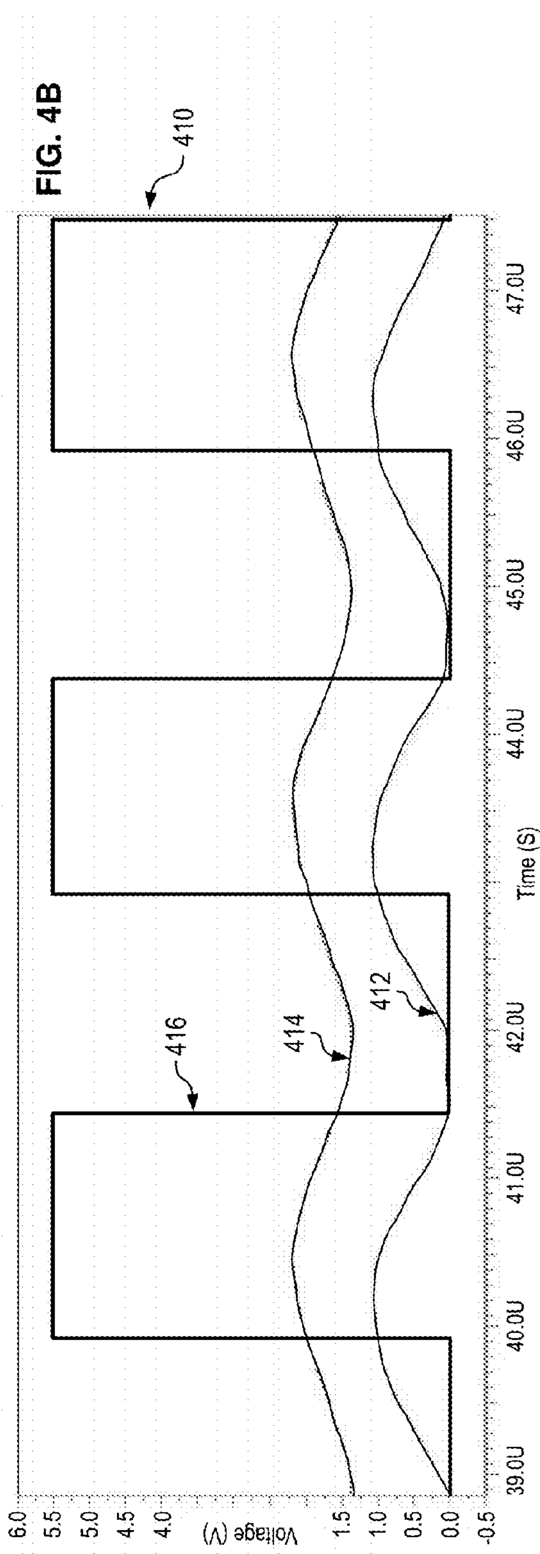
FIG. 4B illustrates a diagram with waveforms showing example slicer circuit operation for BMC-encoded data “1”, according to some embodiments.

FIG. 4A illustrates diagram 400 with waveforms showing an example operation of a slicer circuit (e.g., such as slicer circuit 212 in FIG. 2) for valid BMC-encoded data “0”, while FIG. 4B illustrates diagram 410 with waveforms showing an example operation of the slicer circuit for valid BMC-encoded data “1”. According to the USB-PD specification, valid data transmitted on the CC line is encoded with a Biphase Mark Code (BMC), where a digital data “0” is encoded as a single transition within a time unit and a digital data “1” is encoded as two transitions within a time unit.

Referring to FIG. 4A, waveform 402 indicates the voltage of an incoming signal on the CC-line, waveform 404 indicates the corresponding voltage at a restore node (e.g., such as restore node 206 in FIG. 2), and waveform 406 indicates the voltage on the rx_data output of a slicer circuit (e.g., such as slicer circuit 212 in FIG. 2). As illustrated in diagram 400, waveforms 402 and 404 indicate that the DC-level of the incoming signal is shifted up by about 1.25V, while waveform 406 indicates that the shifted-up signal (at the restore node) still preserves the BMC encoding of data “0”.

Referring to FIG. 4B, waveform 412 indicates the voltage of an incoming signal on the CC-line, waveform 414 indicates the corresponding voltage at a restore node (e.g., such as restore node 206 in FIG. 2), and waveform 416 indicates the voltage on the rx_data output of a slicer circuit (e.g., such as slicer circuit 212 in FIG. 2). As illustrated in diagram 410, waveforms 412 and 414 indicate that the DC-level of the incoming signal is shifted up by about 1.25V, while waveform 416 indicates that the shifted-up signal (at the restore node) still preserves the BMC encoding of data “1”.

Figure 5:
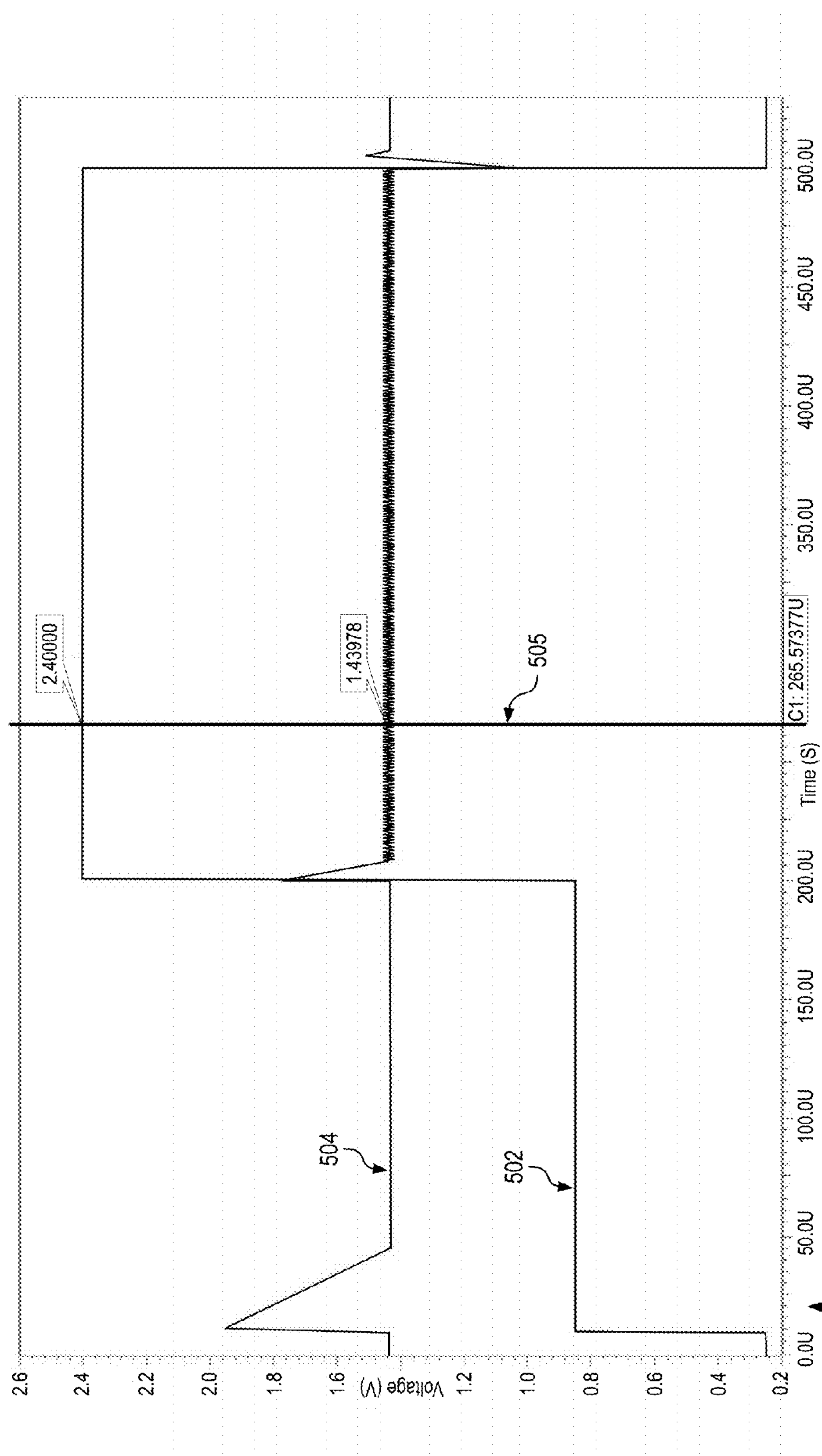
FIG. 5 illustrates a diagram with waveforms showing example restore node recovery after DC-level shift, according to some embodiments.

FIG. 5 illustrates diagram 500 with waveforms showing an example response at a restore node (e.g., such as restore node 206 in FIG. 2) before and after DC-level voltage shifts of an incoming signal on the CC line. Referring to FIG. 5, waveform 502 indicates the voltage of the incoming signal on the CC-line, waveform 504 indicates the corresponding/response voltage at the restore node, and vertical line 505 indicates a particular time point (“C1”). As illustrated in diagram 500, waveform 502 indicates that the voltage on the incoming signal is first shifted up from about 240 mV to about 840 mV, then is shifted up from about 840 mV to about 2.4V, and finally is shifted down from about 2.4V to about 240 mV. Waveform 504 indicates that in response to these DC-level shifts, the corresponding voltage on the restore node remains centered at about 1.4V both before and after a DC-level shift on the incoming signal. It is noted that the fuzzy line in waveform 504 indicates that a restoration circuit (e.g., such as restoration circuit 208 in FIG. 2) continuously adjusts the voltage on the restore node around a voltage magnitude of 1.4V. Waveform 504 also indicates that the first two DC-level shifts of the voltage on the incoming signal are positive voltage changes, while the third DC-level shift is as negative voltage change. As illustrated in diagram 500, the voltage on the restore node temporarily/briefly follows each the first two DC-level shifts on the incoming signal but thereafter recovers to its steady voltage (e.g., around 1.4V) due to the pull-down by an always-on current sink (e.g., such as current sink 210 in FIG. 2). Diagram 500 also illustrates that at the last DC-level shift of the incoming signal (at around time index 500.0 U), the voltage on the restore node temporarily/briefly follows down but thereafter recovers back to its steady voltage (e.g., around 1.4V) due to the pull-up from a current source (e.g., such as current source 208C in FIG. 2).

Figure 6:
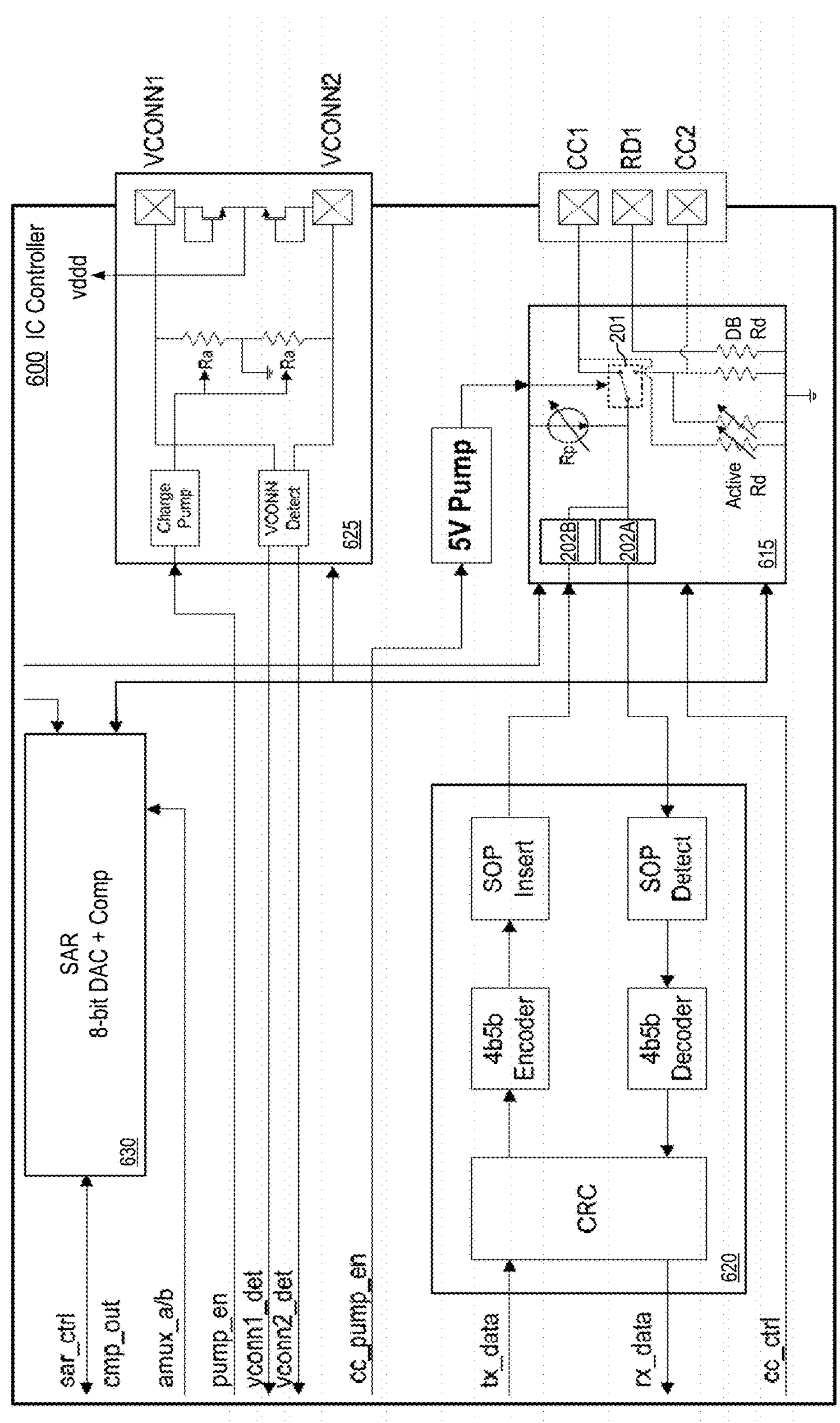
FIG. 6 illustrates an example IC controller in accordance with some embodiments.

FIG. 6 illustrates IC controller 600 in accordance with an example embodiment. IC controller 600 may implement the described techniques for USB Type-C receivers similarly to IC controller 100 in FIG. 1. In FIG. 6, IC controller 600 includes a USB Type-C subsystem that (among other, not shown components) comprises hardware blocks 615, 620, 625, and 630, as well as various other components that provide various control, detect, select, and enable/disable signals to control operations.

Hardware blocks 615 and 620 are configured to implement a USB Type-C transceiver that can operate in accordance with the techniques described herein. For example, hardware block 615 includes multiplexer 201 that is coupled to the CC lines (CC1 and CC2) chip pins, which are part of a USB Type-C connector or port (not shown in FIG. 6). Multiplexer 201 is also coupled to receiver circuit 202A and to transmit circuit 202B that are configured on the CC-line communication path of the USB Type-C subsystem of IC controller 600. Receiver circuit 202A is configured, in accordance with the techniques described herein, to receive data from an incoming signal on the CC line even when the incoming signal has more than 250 mV of DC offset with respect to local ground and to reject the incoming signal as noise even when the incoming signal comprises noise with a magnitude of more than 300 mVpp. In addition, hardware block 615 also provides active and dead battery Rd termination and Rp termination on the CC (CC1/CC2) lines and has comparators that are used to sense the DC voltage levels on the CC lines for UFP and DFP applications. An Rp termination circuit ("Rp termination") includes pull-up resistor element(s) which, when asserted, identify a host device over a Type-C cable. An Rd termination circuit ("Rd termination") includes pull-down resistor element(s) which, when asserted, identify a peripheral device over a Type-C cable.

The output of receiver circuit 202A is coupled to the components in hardware block 620. Hardware block 620 is configured to receive a valid CC-line signal from receiver circuit 202A and, based on the received signal, to detect a start of packet (SOP), to decode the data from the packet by using 4b5b decoding, and to perform a cyclic redundancy check (CRC) on the decoded data. Thereafter, hardware block 620 is configured to relay the decoded and checked data to other components of IC controller 600 and/or the USB Type-C subsystem thereof.

Hardware blocks 625 and 630 are configured to implement various other functions necessary for USB Type-C operation. For example, hardware block 625 implements Ra termination for the VCONN1 and VCONN2 supply pins, and supplies power to the Vddd supply. An Ra termination circuit ("Ra termination") includes pull-down resistor element(s) which, when asserted, can identify the IC controller 600 as a peripheral or a host device connected by a Type-C cable. Hardware block 630 implements an 8-bit Analog-to-Digital Converter (ADC) which, along with a successive approximation register (SAR) control logic, can be used for measuring various voltages in the IC controller chip or off-die.

In accordance with the techniques described herein, the combination of an AC-decoupling capacitor with a DC restoration circuit allows a USB Type-C receiver circuit to achieve effectively unlimited rejection of DC-level shifts in an incoming signal on a CC line. Further, a receiver circuit with such combination needs only two comparators that implement both the receive path and idle noise rejection. The receiver circuits in accordance with the techniques described herein also provide for more idle (and even active) noise rejection, thereby allowing the IC controller chip to remain longer in a sleep state and to conserve power by not waking up due to idle noise. Such receiver circuits also provide a single path both for CC-line activity wakeup and data receipt without requiring additional configuration, can operate in the presence of high VBUS charging currents, and can support non-compliant Type-C cables that can produce a wide range of high DC-level shifts and IR drops.

Various embodiments of the techniques for USB Type-C receivers described herein may include various operations. These operations may be performed and/or controlled by hardware components, digital hardware and/or firmware, and/or combinations thereof. As used herein, the term "coupled to" may mean connected directly or indirectly through one or more intervening components. Any of the signals provided over various on-die buses described herein may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium, e.g., such as volatile memory and/or non-volatile memory. These instructions may be used to program one or more devices that include one or more general-purpose or special-purpose processors (e.g., such as CPUs) or equivalents thereof (e.g., such as processing cores, processing engines, microcontrollers, and the like), so that when executed by the processor (s) or the equivalents thereof, the instructions cause the device(s) to perform the described operations for USB Type-C receivers described herein. A computer-readable medium may also include one or more mechanisms for storing or transmitting information in a form (e.g., software, processing application, etc.) that is readable by a machine (e.g., such as a device or a computer). The non-transitory computer-readable storage medium may include, but is not limited to, electromagnetic storage medium (e.g., floppy disks, hard disks, and the like), optical storage medium (e.g., CD-ROM), magneto-optical storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) herein are shown and described in a particular order, in some embodiments the order of the operations of each circuit may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A device comprising a receiver circuit coupled to a Configuration Channel (CC) line of a Universal Serial Bus (USB) Type-C subsystem, wherein the receiver circuit is configured to receive valid BMC-encoded data from an incoming signal on the CC line when the incoming signal has more than 250 mV of direct current (DC) offset with respect to local ground.

2. The device of claim 1, wherein the receiver circuit is further configured to reject the incoming signal when the incoming signal comprises noise with a magnitude of more than 300 mVpp.

3. The device of claim 2, wherein the magnitude of the noise is in one of: a first range from 300 mVpp to 350 mVpp; a second range from 350 mVpp to 400 mVpp; a third range from 400 mVpp to 450 mVpp; or a fourth range from 450 mVpp to 500 Vpp.

4. The device of claim 2, wherein the incoming signal comprises the noise during idle condition.

5. The device of claim 1, wherein the receiver circuit comprises:

a capacitor coupled in series from the CC line to a restore node, the capacitor configured to block a DC component of the incoming signal on the CC line;

a restoration circuit coupled to the restore node and configured to shift a voltage of the incoming signal to a first reference voltage; and a slicer circuit coupled to the restore node and configured to compare the shifted voltage to a second reference voltage.

6. The device of claim 5, wherein the restoration circuit comprises:

a first comparator configured as an operational amplifier in a feedback loop;

a current source controlled by an output of the first comparator; and a current sink coupled to the restore node;

wherein the restore node couples the capacitor to an output of the current source and to an input of the first comparator.

7. The device of claim 6, wherein the slicer circuit comprises a second comparator, and wherein a first input of the second comparator is coupled to the restore node and a second input of the second comparator is coupled to the second reference voltage.

8. The device of claim 5, wherein the first reference voltage and the second reference voltage are configured to define a voltage threshold at which an output of the slicer circuit is toggled to indicate that the incoming signal is not noise.

9. The device of claim 8, wherein the voltage threshold is up to 500 mVpp.

10. The device of claim 8, wherein the device is configured to remain in a sleep state when the shifted voltage is at or below the voltage threshold.

11. The device of claim 1, wherein the device comprises an integrated circuit (IC) chip, wherein the IC chip includes the USB Type-C subsystem and the USB Type-C subsystem includes the receiver circuit.

12. The device of claim 1, wherein the device is a cable.

13. An integrated circuit (IC) controller comprising:

a Universal Serial Bus (USB) Type-C subsystem; and a receiver circuit coupled to a Configuration Channel (CC) line of the USB Type-C subsystem, the receiver circuit comprising:

a capacitor coupled in series from the CC line to a restore node, the capacitor configured to block a direct current (DC) component of an incoming signal on the CC line;

a restoration circuit coupled to the restore node and configured to shift a voltage of the incoming signal to a first reference voltage; and a slicer circuit coupled to the restore node and configured to compare the shifted voltage to a second reference voltage.

14. The IC controller of claim 13, wherein the restoration circuit comprises:

a first comparator configured as an operational amplifier in a feedback loop;

a current source controlled by an output of the first comparator; and a current sink coupled to the restore node;

wherein the restore node couples the capacitor to an output of the current source and to an input of the first comparator.

15. The IC controller of claim 14, wherein the slicer circuit comprises a second comparator, and wherein a first input of the second comparator is coupled to the restore node and a second input of the second comparator is coupled to the second reference voltage.

16. The IC controller of claim 13, wherein the first reference voltage and the second reference voltage are configured to define a voltage threshold of up to 500 mVpp, and wherein an output of the slicer circuit is toggled to indicate that the incoming signal is not noise when the shifted voltage is above the voltage threshold.

17. The IC controller of claim 13, wherein the receiver circuit is configured to receive data from the incoming signal on the CC line when the incoming signal has more than 250 mV of DC offset with respect to local ground.

18. A system comprising:

a Universal Serial Bus (USB) Type-C cable; and a USB-enabled device attached to the USB Type-C cable, the USB-enabled device comprising a receiver circuit coupled to a Configuration Channel (CC) line of the USB Type-C cable, wherein the receiver circuit is configured to receive valid BMC-encoded data from an incoming signal on the CC line when the incoming signal has more than 250 mV of direct current (DC) offset with respect to local ground.

19. The system of claim 18, wherein the receiver circuit is further configured to reject the incoming signal when the incoming signal comprises noise with a magnitude of more than 300 mVpp.

20. The system of claim 19, wherein the magnitude of the noise is in a range from 300 mVpp to 500 mVpp.

* * * * *